(No Model.)

C. L. COFFIN.
METHOD OF ELECTRIC WELDING.

No. 427,971. Patented May 13, 1890.

Witnesses
Geo. H. Lothrop
Adelaide A. Anderson

Inventor
Charles L. Coffin

UNITED STATES PATENT OFFICE.

CHARLES L. COFFIN, OF DETROIT, MICHIGAN.

METHOD OF ELECTRIC WELDING.

SPECIFICATION forming part of Letters Patent No. 427,971, dated May 13, 1890.

Application filed April 24, 1889. Serial No. 308,417. (No model.)

*To all whom it may concern:*

Be it known that I, CHARLES L. COFFIN, of Detroit, in the county of Wayne and State of Michigan, have invented a new and useful Improvement in Process of Electric Welding, of which the following is a specification.

My invention consists in an improved process of electric welding, hereinafter fully described and claimed.

Figure 3:
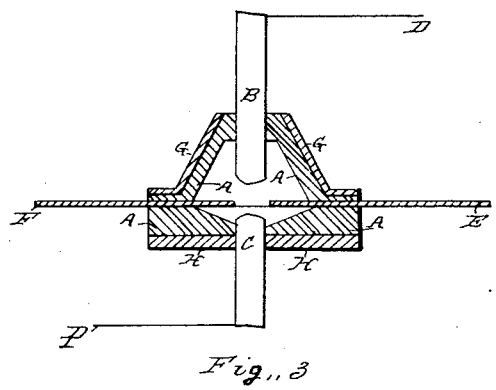
Figure 2:
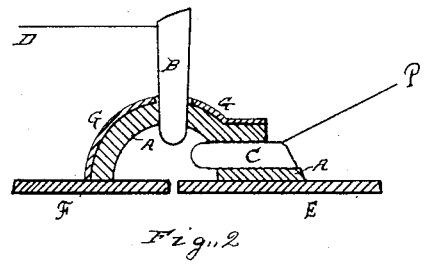
Figure 1:
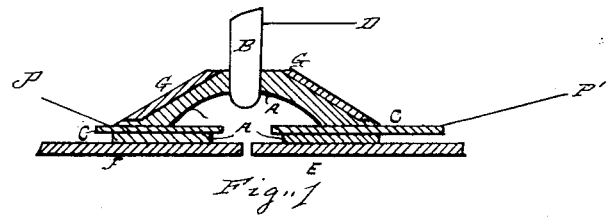

The drawings are vertical sections illustrating the invention, Figs. 1 and 2 showing it applied to that process in which an arc is formed between carbons on the same side of the articles to be welded, and Fig. 3 showing it applied to that process in which a voltaic arc is formed between two carbons on opposite sides of the article to be welded.

The first part of my improved process consists in placing the parts to be welded together in close proximity to the voltaic arc without bringing them in actual contact therewith, and another part of my process consists in protecting the parts to be welded and the arc by a jacket.

In Fig. 1 F and E represent the articles to be welded, and C C represent two plate carbons connected by the wires P P' with one pole of a generator of electricity, and B represents a carbon connected by the wire D with the other pole.

A represents a jacket of refractory material, as asbestus or fire-brick, located on one or both sides of the articles F and E, and the outer skin of this jacket may be of some other material, as carbon. (Indicated at G and H.)

In Figs. 1 and 2 the jacket A incloses the points of the two carbons B and C and rests upon the articles E and F, which are to be welded.

In Fig. 2, as the arc is formed between two carbons both of which are over the article to be welded, it is only necessary to protect the upper side of said articles with the jacket, and therefore the jacket A is entirely on the upper side of the articles F and E, and the carbons B and C pass through holes respectively at the top and side of the jacket.

In Fig. 3 the carbons B and C are above and below the articles F and E to be welded, which pass through a space between the upper and lower part of the jacket.

It will be noticed that the edges of the articles E and F to be welded are in no case directly within the voltaic arc, but are in close proximity thereto, and that the heat of the arc is concentrated and protected from dissipation by the jacket A, whereby burning the edges of the articles F and E through the intense heat of the voltaic arc is avoided, but yet they are readily brought to a plastic condition and they are then pressed together in any of the well-known modes to form weld.

What I claim as my invention, and desire to secure by Letters Patent, is—

The herein-described process of electric welding, consisting in placing the parts to be welded in close proximity to a voltaic arc, protecting the arc and the parts to be welded by a jacket of non-conducting refractory material, and after sufficiently heating the parts pressing them together to complete the weld.

CHARLES L. COFFIN.

Witnesses:
GEO. H. LOTHROP,
ADELAIDE A. ANDERSON.